Figure 1A:
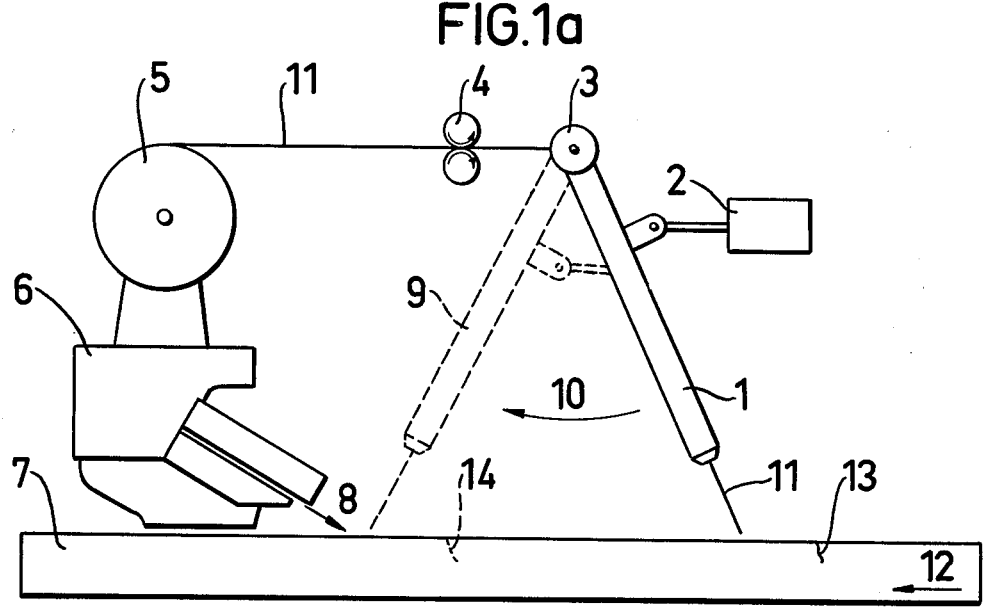

United States Patent [19]

Sipek

[11] 4,139,757
[45] Feb. 13, 1979

[54] METHOD AND DEVICE FOR IGNITING GAS PLANING

[75] Inventor: Ladislav Sipek, Täby, Sweden

[73] Assignee: Centro-Maskin Goteborg AB, Goteborg, Sweden

[21] Appl. No.: 777,420

[22] Filed: Mar. 14, 1977

[51] Int. Cl.² ............................................. B23K 7/00
[52] U.S. Cl. ................................... 219/68; 148/9.5; 148/9 R; 219/121 P; 266/51
[58] Field of Search .............. 219/121 LM, 121 P, 68, 219/69 V, 124, 175 R; 148/9.5, 9 R; 266/48, 51, 74, 75

[56] References Cited

U.S. PATENT DOCUMENTS

| 2,479,412 | 8/1949 | Rutter | 219/124 |
|---|---|---|---|
| 3,033,133 | 5/1962 | Kelly et al. | 148/9.5 X |
| 3,050,616 | 8/1962 | Gage | 219/121 P |
| 3,339,056 | 8/1967 | Grawford | 219/124 |
| 3,658,599 | 4/1972 | Svensson et al. | 148/9.5 |
| 3,806,694 | 4/1974 | Nelson et al. | 219/124 |
| 3,932,726 | 1/1976 | Verheyen et al. | 219/121 LM |
| 3,966,503 | 6/1976 | Engel | 148/9.5 |
| 4,038,108 | 7/1977 | Engel et al. | 148/9.5 |

FOREIGN PATENT DOCUMENTS

| 2437251 | 2/1975 | Fed. Rep. of Germany | 219/68 |
|---|---|---|---|
| 271284 | 12/1970 | U.S.S.R. | 219/68 |
| 329971 | 11/1972 | U.S.S.R. | 219/121 P |

*Primary Examiner*—J. V. Truhe
*Assistant Examiner*—M. Paschall
*Attorney, Agent, or Firm*—Burns, Doane, Swecker & Mathis

[57] ABSTRACT

This invention relates to a method and a device for igniting a gas planing process. The method is based on applying heat to a workpiece by means of a movable heat source, which in principle has a point effect so that the heated or molten portion of the workpiece forms a strip, which in principle extends perpendicularly to the flow direction of the planing oxygen. The device for carrying out the method comprises one or more planing burners and one or more movable ignition means so connected to the burner that the ignition means can move relative to the planing burner both in parallel with and perpendicularly to the planing direction and at the same time carry out the function of a heat source of in principle point shape, which preheats a strip-shaped zone on the surface of the workpiece and/or in addition to said preheating adds molten metal to said zone.

3 Claims, 4 Drawing Figures

METHOD AND DEVICE FOR IGNITING GAS PLANING

Gas planing of steel workpieces is an exothermic process where the ignition temperature lies at 1250° C. It is necessary to preheat to this temperature a certain smallest portion of the workpiece surface where the planing process is to be initiated. For this local preheating usually a flame from a combustion burner is used which, therefore, is an essential part of the planning burner. At manual as well as machine planing it usually is necessary that the workpiece and the planing burner with possibly an ignition device during the ignition process are in a state of relative standstill. This applies both to so-called cold-planing, which normally takes place at room temperature, and to hot-planing, which is carried out at about 800° C. This requirement of standstill, of course, reduces the capacity of planing machines, because at every ignition occasion the machine must be stopped. The time losses due to said requirement are still greater at spot planing where the planing is ignited at each single surface defect. At a high defect frequency the resulting reduction in the capacity of the spot planing machine can be so great, that it is more advantageous to plane the entire surface, in spite of the high material losses.

For solving this problem, which applies primarily to selective spot planing, improvements have been proposed with the object of shortening the ignition process. When the ignition is carried out sufficiently rapidly, the workpiece can move relative to the planing burner and ignition device during the ignition period, so that this possibly may be called a flying start.

In order to accelerate the ignition, at manual planing, a small amount of iron melt is transferred in the form of some droplets to the preheated ignition point. The droplets are formed by melting iron wire in a preheating flame. A similar solution is applied at machine planing, but there iron powder is added instead of iron wire and blown into the preheating flame. The combustion heat of the iron in combination with a favourable effect of the slag on the local heat transfer brings about an acceleration in the preheating of the ignition surface. Only at low relative speeds a flying start will succeed Unfortunately, this is not the only disadvantage involved with the use of iron powder.

It, therefore, had been proposed, instead of combusting iron powder, to use an electric arc for producing initial melt. The electrode used either is fusible or non-fusible. In both cases material is heated and melted by action of an arc at the point of the workpiece surface where the ignition of the planing process is intended to take place. The use of a fusible electrode has the advantage of rendering it possible to increase the melt amount at the ignition point.

During the activation period of the arc, the electrode either may be stationary or move synchronously with the workpiece. In the first case a zone of melt arises in parallel with the planing direction, and its length depends on the burning time of the arc. In the second case the melt forms a spot, the size of which also is dependent on the burning time of the arc. Immediately after the fusing is completed, the planing burner starts operation. In the oxygen stream from the planing burner the zone or spots of preheated and molten metal are ignited. Owing to the geometry of the melt and the direction of the oxygen stream, the planing process practically commences in a point or line, from which it spreads in wedge shape until it assumes full width.

The described concentration of the melt and preheated metal to a point or a zone extending along the planing direction shortens the ignition procedure substantially and thereby renders flying start possible even at pretty high speeds. A serious drawback of the described method is the formation of relatively deep starting cavities or starting zones with steep edges. It usually is troublesome and at times even impossible to remove these steep flanks by rolling. New secondary defects can thereby arise on rolled sheet metal.

The method of igniting gas planing according to the invention and the device for carrying out said method satisfy the requirement on flying start at gas planing at still higher speeds without showing the aforesaid drawbacks and disadvantages. The invention is based on the utilization of a heat source, which in principle is point-shaped and by action on the surface of the workpiece forms a strip of molten and preheated metal which substantially is oriented perpendicularly to the flow direction of the planing oxygen. The device for carrying out the method comprises planing burners and ignition means, which in their turn consist of a point-shaped heat souce and a means for controlling the same.

The heat source can be controlled relative to the burner both in parallel with and perpendicularly to the planing direction. Simultaneously with said relative movement said heat source can be activated. At a suitable setting of the relative movement of the ignition device to the burner with respect to the relative speed of the workpiece to the burner, according to the invention a strip of molten and preheated metal is formed by the action of the activated heat source and extends across the planing oxygen stream.

As heat source in the ignition device primarily an electric arc is used which burns between the workpiece and a fusible or non-fusible electrode. The utilization of the invention is not restricted to an electric arc as point heat source. Similar effect can be achieved also with other heat sources rich in energy and in principle of point shape, as for example plasma burner, laser, electron-beam or possibly high-efficiency combustion burner.

Figure 1B:
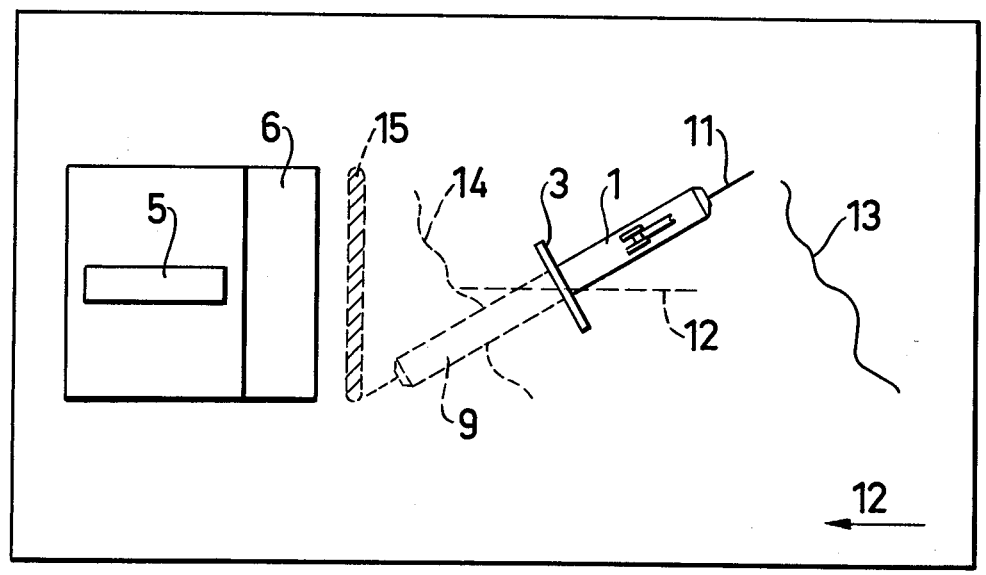

The invention is illustrated in greater detail with reference to the accompanying drawings, in which FIGS. 1a and 1b show an example of a device for carrying out the method according to the invention, where an electric arc is used as point-shaped heat source which burns between a fusible wire electrode and a workpiece. FIG. 1a is a lateral view of the device, and FIG. 1b is a view from above of the device.

Figure 2A:
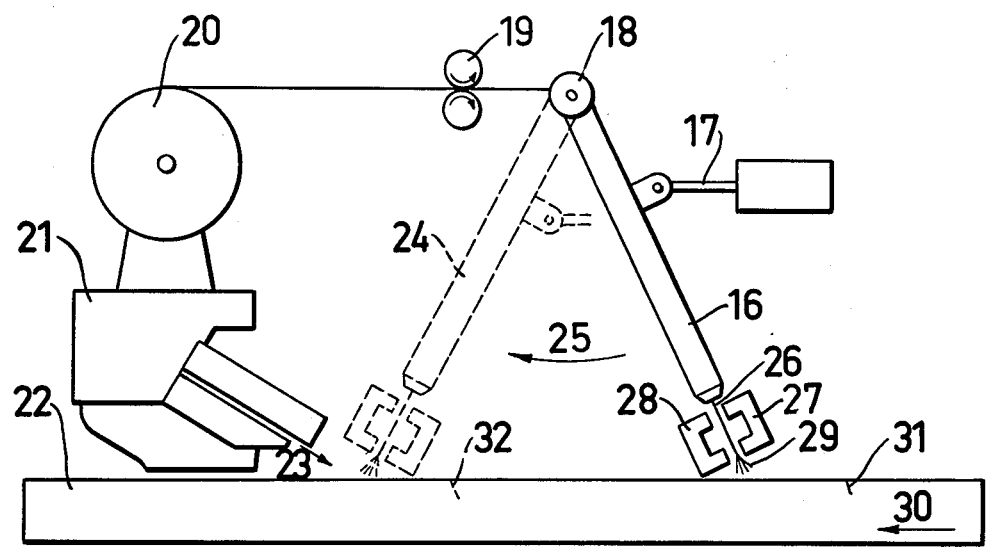
Figure 2B:
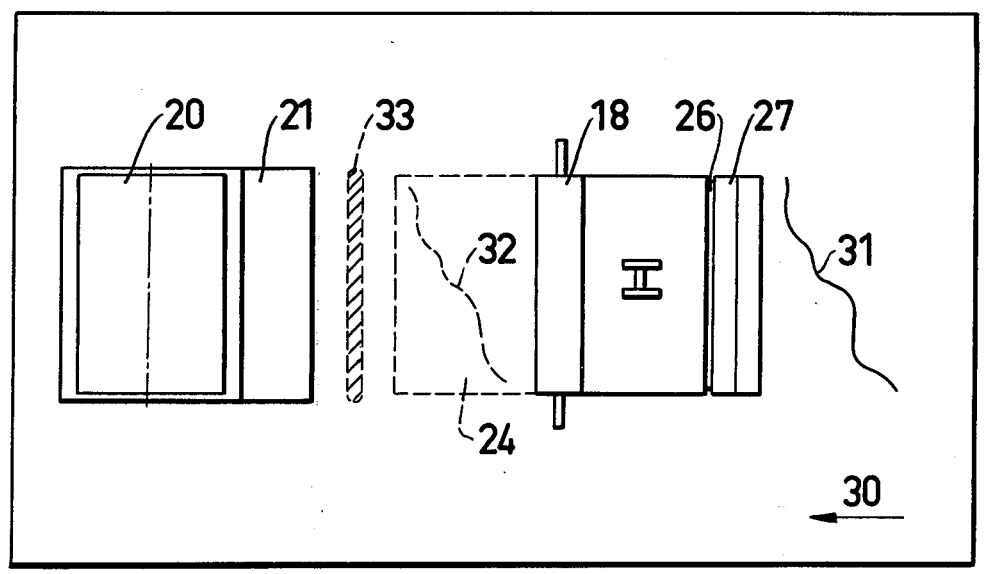

FIGS. 2a and 2b show a second example of the device of carrying out the method, where the arc as point-shaped heat source burns between a fusible web electrode and a workpiece. FIG. 2a is a lateral view, and FIG. 2b a view from above the device.

In FIG. 1a the numeral 1 designates a control means for an ignition wire 11, which is shown in starting position for preheating and fusing a strip-shaped ignition area. 2 Designates a drive means, for example a compressed-air cylinder, which during the fusing period drives the control means 1 in a pendulum-like movement 10 about a fixed axle 3. The pendulum plane of the control means forms a certain angle with the direction of the relative movement 12 of the workpiece 7 to a planing burner 6 (see FIG. 1a). A wire electrode 11 is advanced from a magazine 5 by a feed means 4. During ignition and planing, the planing burner 6 directs planing oxygen stream in the direction 8 and possibly a preheating flame to the place to be planed. The dashed line in FIG. 1a indicates the position 9 for the control means after completed preheating and fusing of a strip-shaped ignition area. In FIG. 1a further is shown a crack as an example of a surface defect to be planed. 13 indicates the crack in the position when the ignition device is activated and the fusion of the electrode commences, and 14 with dashed line indicates the position of the crack after completed fusion when the planing can be ignited.

In FIGS. 1 and 2 the planing device is stationary, and the workpiece moves in relation to the planing device in a direction opposed to the planing direction. It does not affect the method of igniting the planing according to the invention if, if instead, the relative movement would be effected by a stationary workpiece and a moving planing device. The speed and angle of the pendulum movement 10 is chosen according to the invention always with respect to the speed of the relative movement 12. The pendulum movement speed component in parallel with the movement 12 shall be equal to the speed of this movement. In this way, during the activation period of the ignition device, said component of the relative movement of the electrode 11 to the workpiece 7 is substantially equal to zero. The transverse component, however, of the pendulum movement is independent of the workpiece movement. At the beginning of the pendulum movement 10 with the ignition device in starting limit position 1, the electric arc is ignited. The arc burning between the electrode and workpiece preheats and melts a small spot of the workpiece surface closest to the electrode point. Simultaneously also the electrode 11 fuses which is advanced by the wire feed unit 4. Fused electrode material is transferred to the workpiece. Energy to the arc is fed from a current source connected between the workpiece and a contact means on the electrode control. The current source with associated electric circuit is not shown in the Figure.

During the burning of the arc the electrode control means 1 moves from the starting position to the limit position 9. As a result thereof and of all total movements (the pendulum plane forms an angle with the relative movement direction 12) a strip of preheated and molten metal 15 is formed on the workpiece. At a suitable position of the axle 3 and the choice of a suitable time for commencing the movement 10, the melt 15 after completed movement 10 shall be directly in front of the extension 8 of the nozzle passageway, in which the planing oxygen flows out from the burner 6. When the oxygen flow is started at this moment, the metal in the strip 15 is ignited, and thereby also the planing process is ignited.

As a consequence of the spread of preheated and molten metal according to the invention, the planing commences across the entire width corresponding to the length of the strip 15 which in FIG. 1 is equal to the width of the burner 6. This also implies that the planing groove starts with full width, so that no wedge-shaped starting cavity with sharp edges can arise.

The planing groove starting with full width also renders it possible for the planing to commence immediately close to the surface defect 13, 14. A shortening of the starting distance of the planing groove, thus, saves material and simultaneously time by shortening the planing time.

The geometry of the ignition zone which according to the invention extends in the transverse direction in front of the burner, besides, renders it possible to start the planing process more reliably, more rapidly and more easily. A further important advantage of the ignition method according to the invention is that also surface defects can be planed which are located near the front edge of the workpiece. The conventional ignition methods using point heat sources do not render this possible with maintained planing direction on the workpiece.

It is not necessary that the ignition strip 15 has a width equal to the burner 6. The igniting according to the invention, of course, can take place with the strip 15 being wider than the burner. Tests under service conditions have shown that flying start can be obtained also with the strip being substantially shorter than the burner.

As wire electrode in FIG. 1 advantageously an iron wire can be used, the fusion of which increases the amount of the ignition melt. For carrying out the ignition method according to the invention, of course, also another metal or alloy can be used as electrode material which burns exothermally or in another way favourably acts upon the igniting of the planing process. The invention is not restricted, either, to the using of only one wire electrode. Two or more such electrodes in parallel can be used advantageously. Arcs can be produced between each electrode and the workpiece or only between the electrodes proper. The arcs are fed from one common or several separate current sources. Control and contact means for two or more electrodes can be arranged so that their arcs either follow each other or operate in parallel with each other.

The same effect can possibly also be achieved by means of a simple ignition device with a multiple ignition wire by repeating the fusion period, if the return from end position 9 to starting position 1 in FIG. 1 is carried out sufficiently rapidly.

By using two or more electrodes, or by repeating the fusion period it is possible to additionally increase the ignition speed for flying start. Another method of increasing the amount of metal with a temperature lying above the ignition temperature at the application of the method according to the invention is the utilization of chemical combustion heat prior to the commencing of the planing proper. The fusing of the electrode, for example, can be carried out in oxidizing atmosphere. The oxygen required can be supplied by an auxiliary oxygen nozzle suitably disposed and, for example, coupled mechanically to the control means of the electrode. The device proper is so simple that it is not shown in FIG. 1. The same effect can be achieved, alternatively, by using a tube electrode, through which oxygen is fed to the fusion point or which is filled with a suitable oxidation agent.

In the foregoing the application of a fusible electrode and arc for forming the ignition strip 15 on the surface of the workpiece has been described. It is obvious, that the principle of the invention is not changed by using, instead, a non-fusible electrode. In such a case, only the arc heats and melts the workpiece. The device for carrying out this method does not in principle differ from that shown in FIG. 1. The only difference is that no wire magazine 5 and feed means 4 are provided. The control and contact means 1, 9 are replaced by a holder for non-consumable electrode which performs the same pendulum movement.

In the same manner as at the use of consumable electrode also at the use of a non-consumable electrode an auxiliary nozzle can be used, which blows oxygen on the melt already during the preheating, in order to increase the temperature and the amount of the molten metal. It is further obvious that, instead of a simple non-consumable electrode, several more advanced heat sources of point-type can be used, based on the use of an arc, for example a plasma burner. It also is obvious that for the igniting of the planing according to the invention also suitable non-electric point heat sources can be used, for example lasers rich in energy. In such a case the electrode control means 1 in FIG. 1 is replaced by an optical deflection system, which during the ignition procedure projects the laser beam on the workpiece, so that the resulting strip of metal heated to ignition temperature extends across the presupposed planing direction.

It also is apparent from the description of the invention, that the desired effect according to the invention can be achieved also when the pendulum movement 10 shown in FIG. 1 between the starting position and the position 9 is replaced by another movement, which per se is known, for example a longitudinal movement. The invention only requires that the result of the total relative movement of the workpiece and ignition device during the action of the ignition device on the workpiece is a strip of preheated metal. Said strip in principle shall extend across the flow direction of the planing oxygen. In practice certain tolerances must be permitted, depending on the accuracy with which relative movements can be controlled.

Another example of an alternative solution of planing ignition is shown in FIGS. 2a and 2b. At this alternative the transverse component of the movement of the electrode control is replaced by a controlled or free movement of an electric arc along the width of a fusible strip electrode. In FIG. 2a the numeral 16 designates the control and contact means for the strip electrode 26 advanced from a container 20 by the feed means 19. Between the electrode 26 and the workpiece 22 an electric arc 29 fed from a conventional weld current source burns during the activation period of the ignition device. The current source is connected between the workpiece 22 and the contact means 16, but for reason for simplicity it is not shown in the Figure. During the activation of the ignition device the control means 16 of the electrode performs a pendulum movement 25 about the axle 18 by means of the drive mechanism 17. The pendulum movement speed between starting position 16 and end position 24 indicated by dashed line is adjusted to the speed of the workpiece movement 30. Hereby, the position of the end of the strip electrode 26 (and the arc 29 burning to the workpiece 22) is stationary relative to the workpiece 22. The arc 29 burning during the activation period of the ignition device is controlled by means of a magnetic field produced by electromagnets 27, 28. During the pendulum movement 25, the arc shall at least once move from one edge of the strip electrode over to the other edge thereof.

In FIGS. 2a and 2b, furthermore, a surface defect is shown in position 31 at the beginning of the activation period and by a dashed line in position 32 after completed fusion of the strip electrode. The result of the pendulum movement 25 and of the effect of the arc 29 is a strip of molten and preheated metal 33. It is located in front of the planing burner 21 and approaches the same at the relative speed 30. The arrow 23 indicates the flow direction of planing oxygen from the burner 21. The oxygen is opened when the melt 33 approaches the extension of the direction 23. In the oxygen flow the melt 33 is ignited and ignites the planing process immediately and simultaneously in the entire planing groove width. The ignition procedure is thereby completed, and the ignition device can return to non-operative position. In this position the ignition device waits for a control signal for a new activation between position 16 and 24.

It is apparent from the description of the invention, that a replacement of the pendulum movement 25 in FIG. 2 by another equivalent longitudinal movement between the starting and end position of the control means should not affect the principle of the ignition method according to the invention. It also is apparent, that the width of the strip electrode which in FIG. 2 is equal to the width of the burner can be both narrower and wider than the burner without affecting the principle of the invention. It is also unessential for carrying out the method, if for control of the arc movement along the strip other means than magnetic fields are used, for example the free movement of the arc due to a successive fusion of the strip.

The method according to the invention is suitable for use at igniting with flying start at high as well as low speeds. It is, therefore, obvious to the expert that the ignition method also can be used in such extreme cases when the relative speed of the workpiece to the burner is equal to zero.

What I claim is:

1. A method for igniting gas planing on a workpiece comprising:
   imparting a substantially continuous motion to said workpiece past the gas planing burner;
   preheating a certain amount of metal to ignition temperature by means of a point heat source;
   imparting to said heat source a relative movement with respect to said planing burner with a speed component substantially equal to the absolute movement speed resultant of said workpiece;
   forming at least one strip of preheated metal on said workpiece surface;
   providing a flow of planing oxygen for igniting said strip; and
   said strip extending transverse to the flow direction of said planing oxygen.

2. A method according to claim 1, characterized in that the heat source is imparted a speed component directed perpendicularly to the flow direction for the planing oxygen.

3. A method according to claim 1, characterized in that the relative movement of the heat source is caused to substantially coincide with the relative movement of the workpiece to the planing burner.

* * * * *